(12) United States Patent
Irino et al.

(10) Patent No.: US 8,966,912 B2
(45) Date of Patent: Mar. 3, 2015

(54) HEAT EXCHANGING SYSTEM

(75) Inventors: Yasumi Irino, Fuji (JP); Sheng-Fan Hsieh, Taoyuan Hsien (TW); Min-Chia Wang, Taoyuan Hsien (TW); Tiao-Yuan Wu, Taoyuan Hsien (TW); Chieh-Shih Chang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 297 days.

(21) Appl. No.: 13/472,079

(22) Filed: May 15, 2012

(65) Prior Publication Data

US 2013/0305741 A1    Nov. 21, 2013

(51) Int. Cl.
*F25B 21/00*    (2006.01)

(52) U.S. Cl.
USPC ................................... 62/3.1; 62/260

(58) Field of Classification Search
USPC ............................ 62/3.1, 260, 324.1; 165/45
See application file for complete search history.

(56) References Cited

U.S. PATENT DOCUMENTS

| | | | | |
|---|---|---|---|---|
| 3,841,107 | A * | 10/1974 | Clark | 62/3.1 |
| 4,107,935 | A * | 8/1978 | Steyert, Jr. | 62/3.1 |
| 4,392,356 | A * | 7/1983 | Brown | 62/3.1 |
| 5,024,059 | A * | 6/1991 | Noble | 62/3.1 |
| 5,444,983 | A * | 8/1995 | Howard | 62/3.1 |
| 6,526,759 | B2 * | 3/2003 | Zimm et al. | 62/3.1 |
| 2003/0221436 | A1 * | 12/2003 | Xu | 62/260 |
| 2007/0271940 | A1 * | 11/2007 | Yang | 62/260 |
| 2011/0048032 | A1 * | 3/2011 | Chang et al. | 62/3.1 |

* cited by examiner

*Primary Examiner* — Melvin Jones
(74) *Attorney, Agent, or Firm* — Muncy, Geissler, Olds & Lowe, P.C.

(57) ABSTRACT

A heat exchanging system is provided for conditioning indoor temperature of a building. The heat exchanging system includes a magnetic refrigerator, an indoor heat exchanger and an outdoor heat exchanger. The indoor heat exchanger is thermally connected to the magnetic refrigerator. The outdoor heat exchanger is thermally connected to the magnetic refrigerator. The outdoor heat exchanger includes a geothermal heat exchanging unit, wherein the geothermal heat exchanging unit is embedded under the ground of a building.

14 Claims, 7 Drawing Sheets

HEAT EXCHANGING SYSTEM

BACKGROUND OF THE INVENTION

1. Field of the Invention

The present invention relates to a heat exchanging system, and in particular relates to a heat exchanging system with a magnetic refrigerator.

2. Description of the Related Art

Conventional refrigeration devices usually comprise a compressor for compressing a cooling fluid in order to raise its temperature and expansion means to decompress a cooling fluid in order to cool it adiabatically. These conventional devices have a number of disadvantages. In effect, gases such as the CFCs (chlorofluorocarbons) currently used as the cooling fluid are serious pollutants and their use entails great risks for atmospheric pollution and destruction of the ozone layer. Consequently, those gases do not satisfy present-day requirements, nor the environmental standards of many countries. Furthermore, such conventional equipment, which operates under pressure, has to be installed and maintained by trained and certified personnel who must follow constraining procedures with lengthy, numerous and highly demanding implementation requirements. Finally, such equipment is noisy, produces vibrations, is bulky and complex, and consumes a lot of electrical energy. So conventional devices are not satisfactory.

BRIEF SUMMARY OF THE INVENTION

A heat exchanging system is provided for conditioning indoor temperature of a building. The heat exchanging system includes a magnetic refrigerator, an indoor heat exchanger and an outdoor heat exchanger. The indoor heat exchanger is thermally connected to the magnetic refrigerator. The outdoor heat exchanger is thermally connected to the magnetic refrigerator. The outdoor heat exchanger includes a geothermal heat exchanging unit, wherein the geothermal heat exchanging unit is embedded under the ground of a building.

Utilizing the heat exchanging system of the embodiment of the invention, in the summer, a temperature of a building may be higher than a temperature of the ground, thus, the magnetic refrigerator moves the heat from the building to the ground to cool the building. In the winter, a temperature of a building may be lower than a temperature of the ground, thus, the magnetic refrigerator moves the heat from the ground to the building to warm the building. The invention improves heat exchanging efficiency by exchanging heat with the ground. Additionally, the invention utilizes a magnetic refrigerator to replace the conventional compressor refrigerator, which is quieter, produces less vibrations, and consumes less electrical energy.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
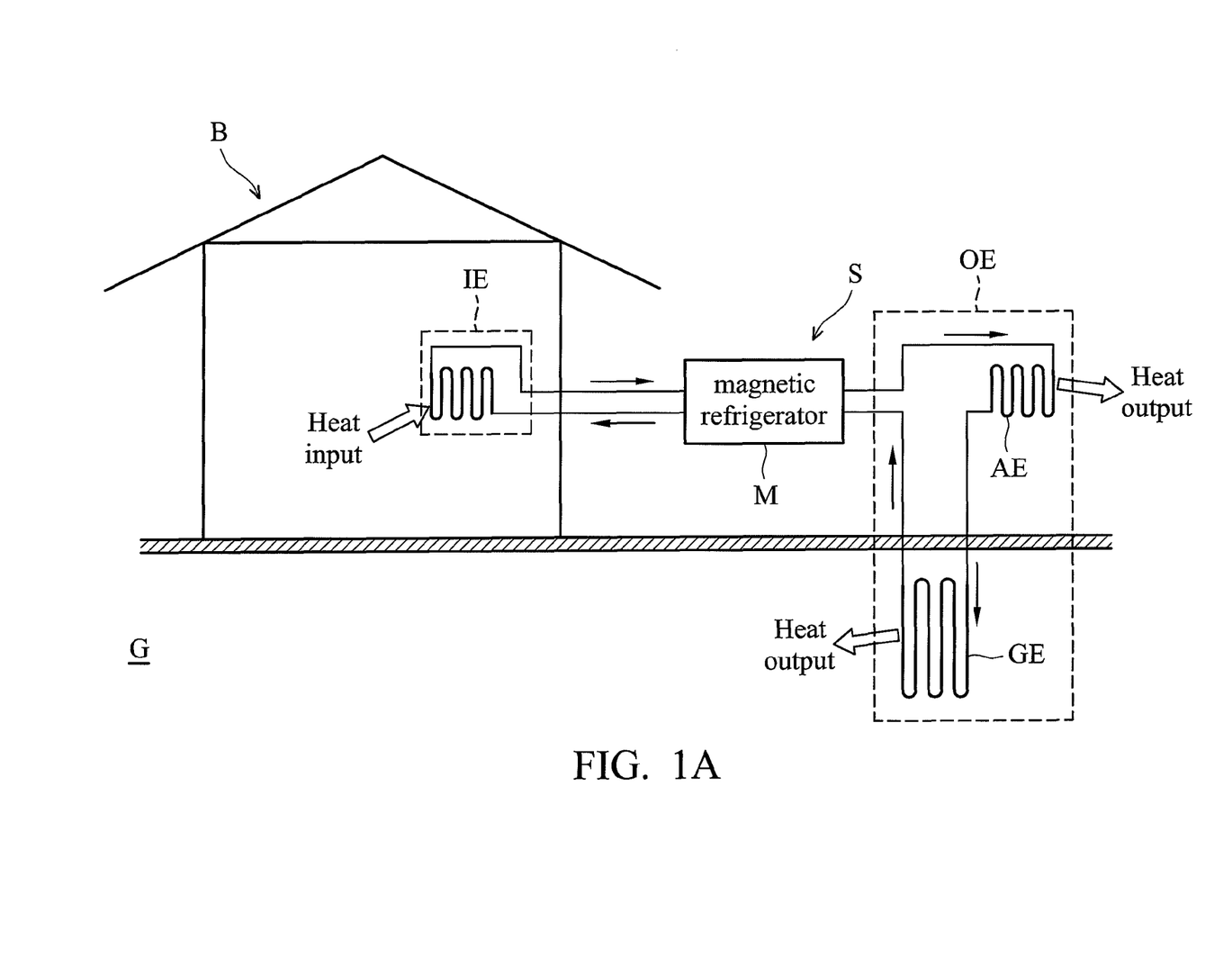
FIG. 1A shows a heat exchanging system of a first embodiment of the invention, wherein the heat exchanging system is in a cooling state.

FIG. 1A shows a heat exchanging system S of a first embodiment of the invention for conditioning indoor temperature of a building B (building body). The heat exchanging system S comprises a magnetic refrigerator M, an indoor heat exchanger IE and an outdoor heat exchanger OE. The indoor heat exchanger IE is disposed inside of the building B (building body) and is thermally connected to the magnetic refrigerator M. The outdoor heat exchanger OE is disposed outside of the building B (building body) and is thermally connected to the magnetic refrigerator M. The outdoor heat exchanger OE comprises a geothermal heat exchanging unit GE, wherein the geothermal heat exchanging unit GE is embedded under a ground G of the building B.

Figure 1B:
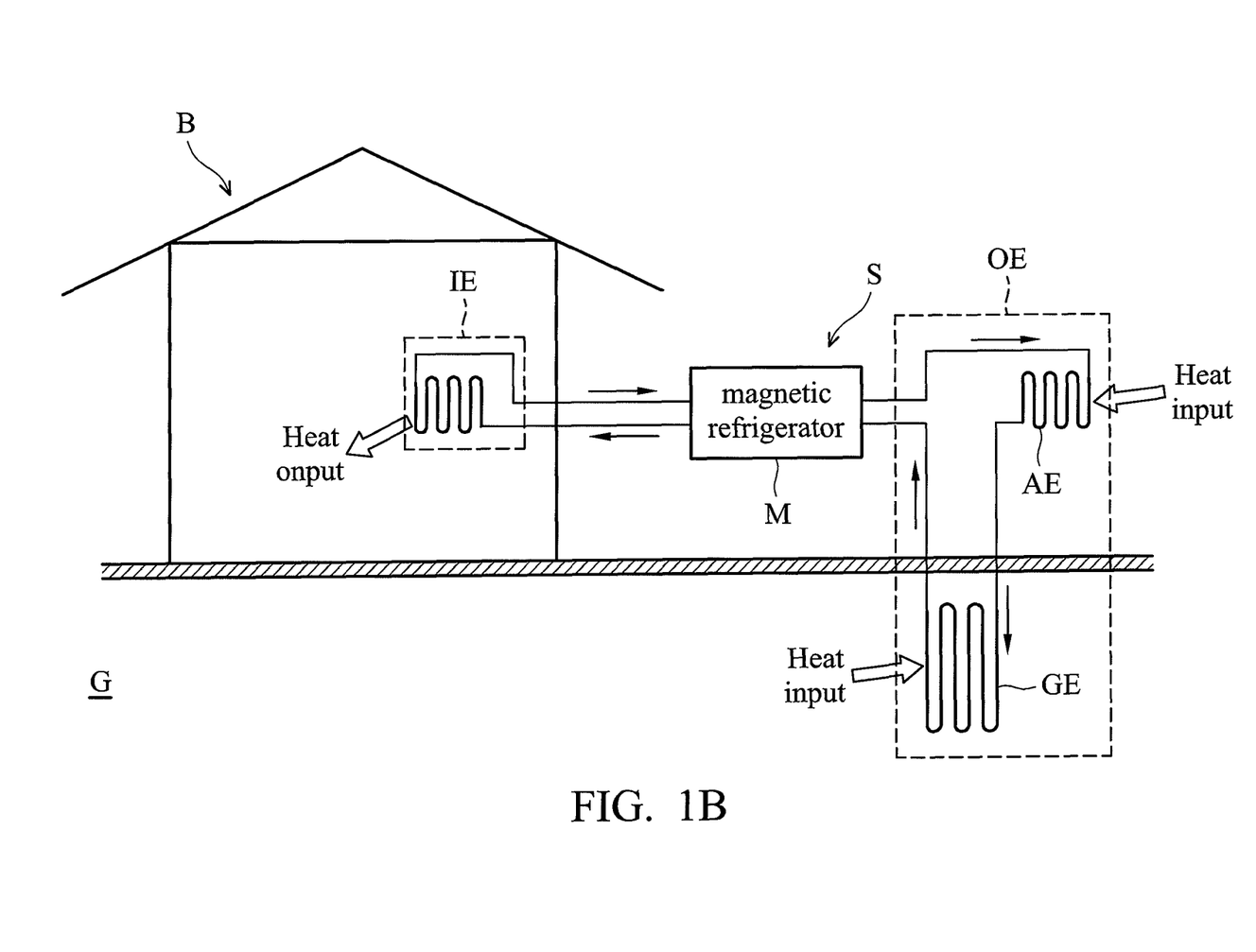
FIG. 1B shows the heat exchanging system of the first embodiment of the invention, wherein the heat exchanging system is in a heating state.

As shown in FIG. 1A, in a cooling state, heat inside of the building B is moved by the magnetic refrigerator M from the indoor heat exchanger IE to the outdoor heat exchanger OE to be dissipated to the ground. With reference to FIG. 1B, in a heating state, heat from the ground G is moved by the magnetic refrigerator M from the outdoor heat exchanger OE to the indoor heat exchanger IE to heat the building B.

With reference to FIG. 1A, in the first embodiment, the outdoor heat exchanger OE further comprises an air heat exchanging unit AE, wherein the air heat exchanging unit AE and the geothermal heat exchanging unit GE are thermally connected to the magnetic refrigerator M.

Figure 2:
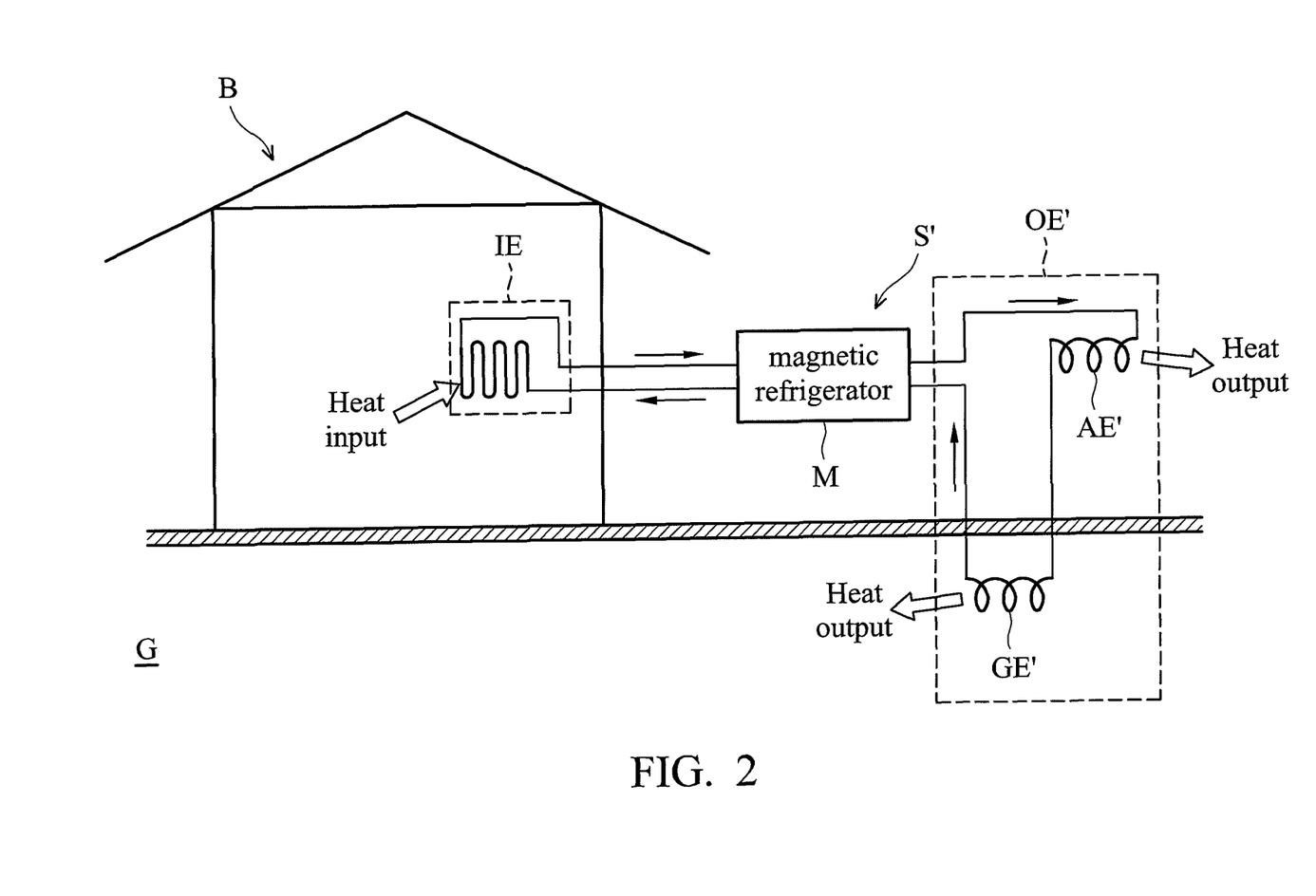
FIG. 2 shows a heat exchanging system of a modified example of the first embodiment of the invention.

In the first embodiment, an outdoor heat exchanging fluid (not shown) can be filled in the outdoor heat exchanger OE. The outdoor heat exchanging fluid travels from the magnetic refrigerator M, passes through the air heat exchanging unit AE and the geothermal heat exchanging unit GE, and travels back to the magnetic refrigerator M for transporting heat. The air heat exchanging unit AE and the geothermal heat exchanging unit GE comprise tortuous portions to improve heat exchanging efficiency. FIG. 2 shows a heat exchanging system S' of a modified example of the first embodiment of the invention, wherein a heat exchanging unit AE' and a geothermal heat exchanging unit GE' of an outdoor heat exchanger OE' comprise spiral portions to improve heat exchanging efficiency.

Figure 3A:
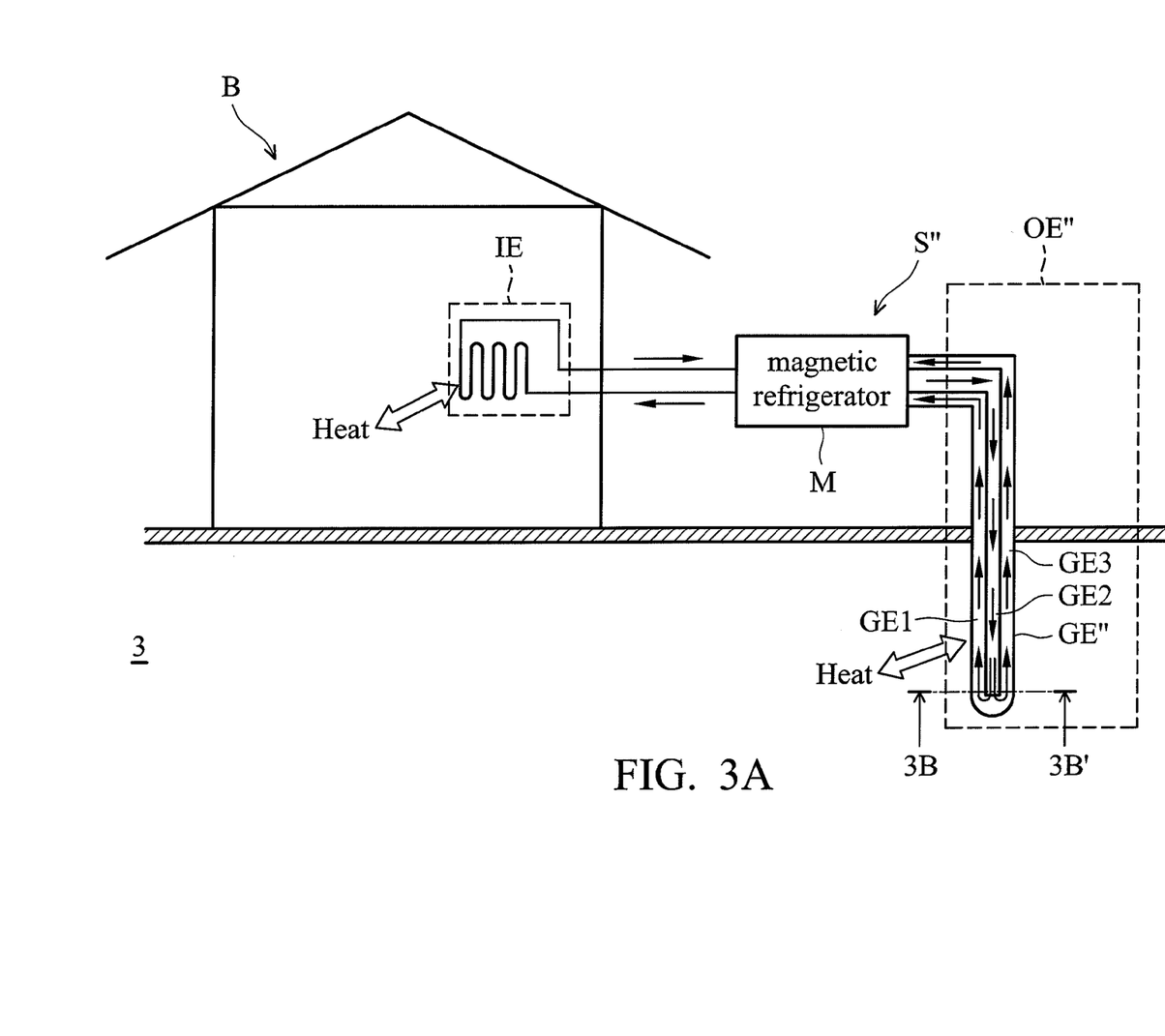
FIG. 3A shows a heat exchanging system of a second embodiment of the invention.
Figure 3B:
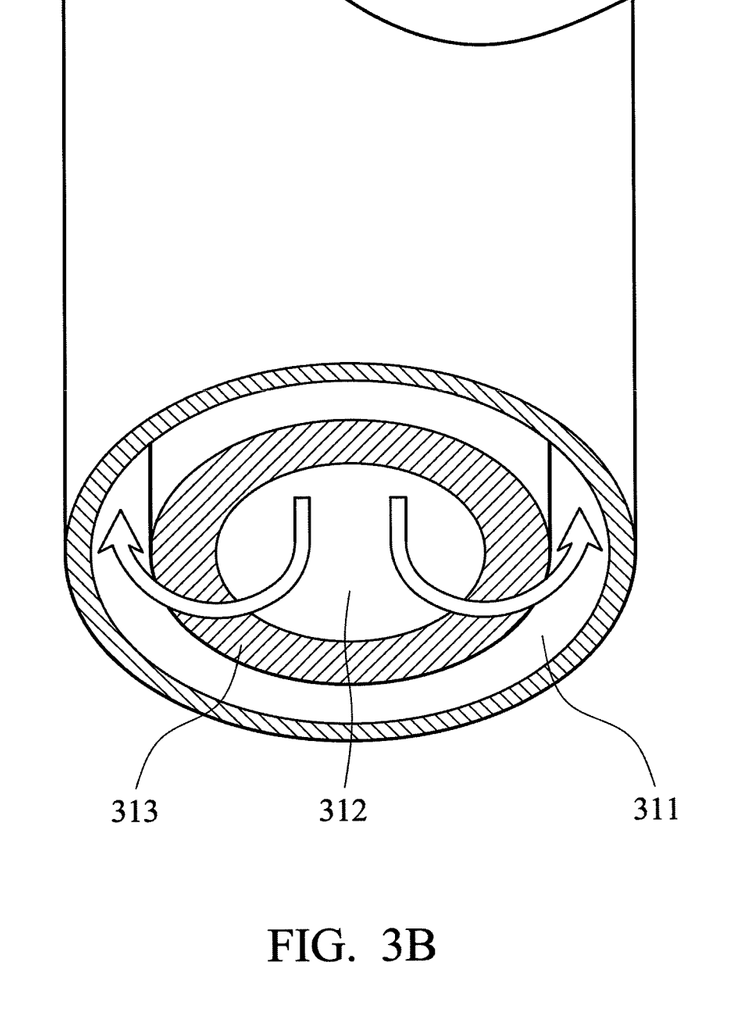
FIG. 3B shows a cross-section along direction 3B-3B' of FIG. 3A.

FIG. 3A shows a heat exchanging system S" of a second embodiment of the invention, wherein a geothermal heat exchanging unit GE" of an outdoor heat exchanger OE" comprises an outer path GE1, an inner path GE2 and an insulation layer GE3, wherein the insulation layer GE3 separates the outer path GE1 and the inner path GE2. The outdoor heat exchanging fluid travels from the magnetic refrigerator M, along the inner path GE2, and then travels back to the magnetic refrigerator M via the outer path GE1 to exchange heat with the ground G. With reference to FIG. 3B, FIG. 3B shows a cross-section along direction 3B-3B' of FIG. 3A.

Utilizing the heat exchanging system of the embodiment of the invention, in the summer, a temperature of a building is higher than a temperature of the ground, and the magnetic refrigerator moves the heat from the building to the ground to cool the building. In the winter, a temperature of a building is lower than a temperature of the ground, and the magnetic refrigerator moves the heat from the ground to the building to warm the building. The invention improves heat exchanging efficiency by exchanging heat with the ground. Additionally, the invention utilizes a magnetic refrigerator to replace the conventional compressor refrigerator, which is quieter, produces less vibrations, and consumes less electrical energy.

FIGS. 4, 5 and 6A-B show a detailed structure of an embodiment of the magnetic refrigerator M. The magnetic refrigerator M comprises a device 1 for thermal flux generation with a magneto-caloric material. The device 1 comprises a thermal flux generation unit 10 provided with twelve thermal bodies 11 each defining a circular sector. Each thermal body 11 forms an independent mechanical element which can be adapted according to need. These thermal bodies 11 are arranged in sequence essentially in a circle, and are mutually separated by one or more thermally insulating elements such as a space J, an insulating material, or any other equivalent means.

Figure 4:
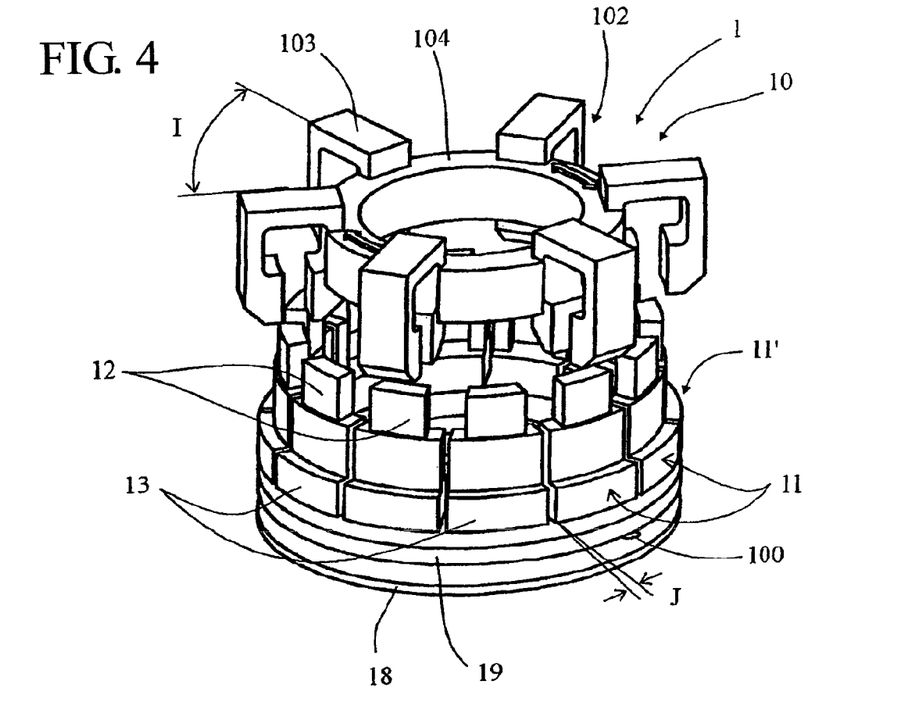
FIG. 4 shows an exploded perspective view of an embodiment of a device of a magnetic refrigerator of the invention.

The thermal bodies 11 contain a magneto-caloric element 12 made of a magneto-caloric material such as gadolinium (Gd), a gadolinium alloy containing for example silicon (Si), germanium (Ge), iron (Fe), magnesium (Mg), phosphorus (P), arsenic (As), or any other equivalent magnetizable material or alloy. The choice between magneto-caloric materials is made having regard to the heating and cooling powers sought and the temperature ranges needed. Similarly, the quantity of magneto-caloric material used in the thermal body 11 depends on the heating and cooling powers installed, the range of operating temperatures, the installed power of the magnetic field and the nature of the magneto-caloric material itself. For information, it is for example possible to obtain 160 Watts of cooling power with 1 kg of gadolinium, a magnetic field of 1.5 Tesla, a temperature range of 33° C. and a cycle of 4 seconds, said cycle comprising successive phases of exposure and non-exposure to the magnetic field.

In this example the magneto-caloric element 12 is in the form of a circular sector and each thermal body 11 comprises a heat-conducting element 13 which extends to the magneto-caloric element 12 laterally. The heat-conducting element 13 is made of a conductive material chosen for its good thermal conductivity, such as copper or its alloys, aluminum or its alloys, steel or steel alloys, stainless metals or their alloys, or any other equivalent material. Thus, when the magneto-caloric element 12 warms up or cools under the effect of the magnetic field variation, it transfers part of its calories or frigories to the heat-conducting element 13 which warms up or cools rapidly, increasing the thermal absorption capacity of the thermal body 11. The geometry of the thermal bodies 11 thus favors a large contact area with the magnetic elements 103 described later. In general, the magneto-caloric material can be a block, a pastille, powder, an agglomerate of pieces, or any other suitable form. The magneto-caloric element 12 can comprise several magneto-caloric materials, for example several plates arranged side by side.

Figure 5:
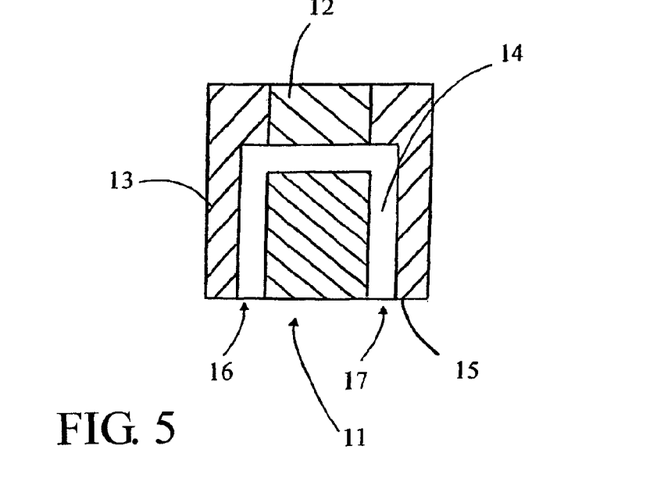
FIG. 5 shows a sectional side view of a thermal body for the heat transfer fluid of the device in FIG. 1.
Figure 6A:
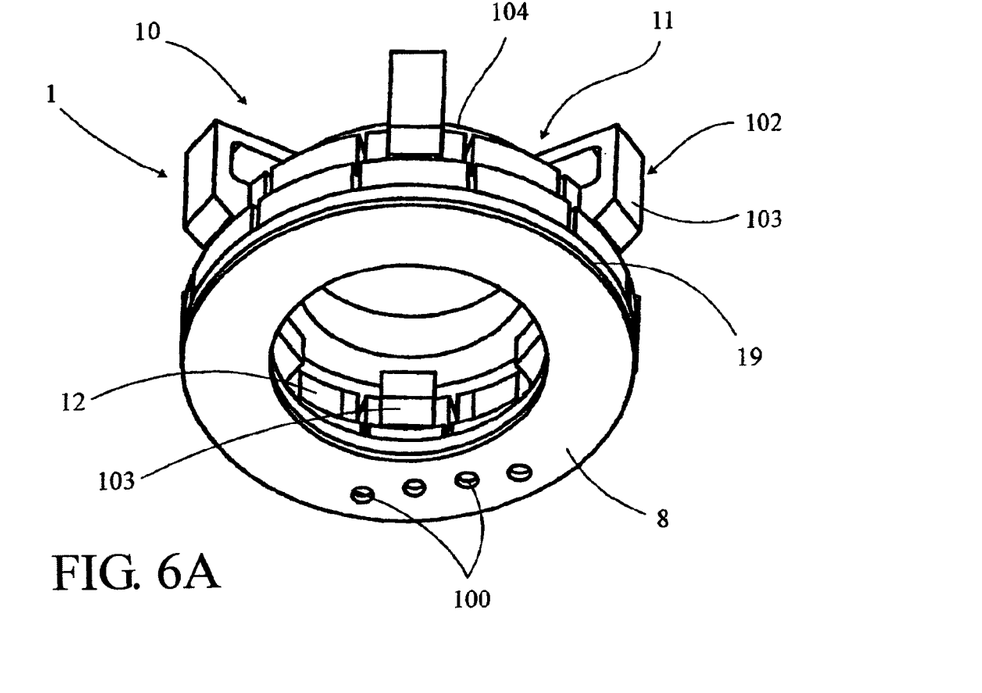
FIGS. 6A-B are perspective views of the device in FIG. 1, shown respectively from below and from above.
Figure 6B:
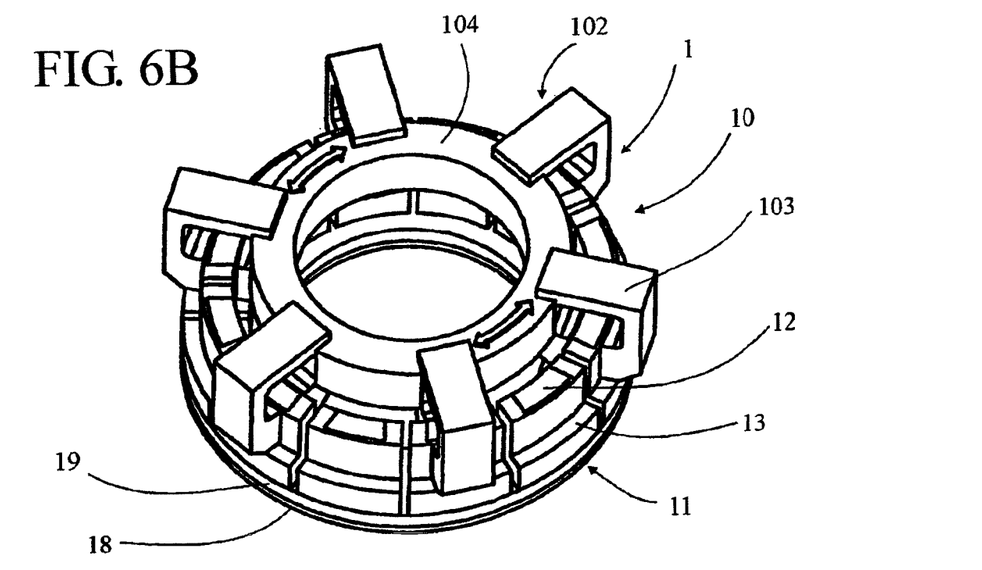

Each thermal body 11 comprises a transfer zone 14 through which the heat transfer fluid passes therethrough to be heated or cooled. This transfer zone, illustrated in FIG. 5, is formed of a through-channel which opens, on the same side in this example, into an essentially flat wall 15 of the thermal body 11 at an inlet orifice 16 and an outlet orifice 17. Of course it is possible to provide, for all or some of the thermal bodies 11, the inlet 16 and outlet 17 orifices to be distributed on two or even a larger number of walls 15, wherein the walls 15 are all flat or may not all be flat.

The thermal bodies 11 are fixed, resting on the wall 15 comprising the inlet 16 and outlet 17 orifices, on a plate 18 made of a mechanically rigid material. On the side facing the plate 18 the thermal bodies 11 are provided with shoulders 11' which increase their area in order to facilitate their mounting on the plate 18 and to improve heat exchange with the heat transfer fluid. The plate 18 and the thermal bodies 11 are separated by a thermal joint 19. This thermal joint 19 and the plate 18 comprise communication orifices 100 which allow passage of the heat transfer fluid. The communication orifices 100 are provided with connectors (not shown) for connecting the inlet 16 and outlet 17 orifices of the transfer zones 14 of the various thermal bodies 11 to one or more external circuits provided with heat exchangers (not shown in these figures). These external circuits are for example formed of rigid or flexible pipes each filled with an identical or different heat transfer fluid. The external circuit(s) and the transfer zones 14 define the heat transfer fluid circuit(s).

Each heat transfer fluid circuit has means (not shown in these figures) for the forced or free circulation of the heat transfer fluid, such as a pump or any other equivalent means. The chemical composition of the heat transfer fluid is adapted to the temperature range desired and is chosen to obtain maximum heat exchange. For example, pure water is used for positive temperatures and water containing antifreeze, for example a glycolated product, is used for negative temperatures. Thus, this device 1 makes it possible to avoid using any fluid that is corrosive or harmful to man and/or his environment. Each heat transfer fluid circuit is also provided with extraction means (not shown in these figures), such as exchangers or any other equivalent means to allow the dispersion of the calories and frigories.

The magnetic means 102 of the device 1 comprise magnetic elements 103 each provided with one or more solid, sintered or laminated permanent magnets which concentrate and direct the magnetic field lines of the permanent magnet. The magnetizable materials can contain iron (Fe), cobalt (Co), vanadium (V), soft iron, a combination of these materials, or any equivalent material. Also, it is understood that any other type of equivalent magnet such as an electromagnet or a superconductor can be used. Nevertheless, permanent magnets have certain advantages in terms of size, simplicity of use, low consumption of electrical energy, and low cost.

The magnetic elements 103 are carried by a mobile support 104. In this example the device 1 has six magnetic elements 103 arranged in sequence essentially in a circle and spaced an interval I apart. The magnetic elements 103 are U- or C-shaped with their arms far enough apart to allow free passage of the thermal bodies 11. The magnetic elements 103 are fixed radially on an essentially circular support in the shape of a ring 104. This ring 104 is mounted to pivot about its axis between two positions and is coupled to means (not shown) for driving it in reciprocation, which moves the ring 104 reciprocally from one position to the other. The reciprocating driving means are for example a motor, a jack, a spring mechanism, an aerogenerator, an electromagnet, a hydrogenerator or any other equivalent means. Compared with continuous or step by step movements, the reciprocating pivoting movement has the advantage of being obtainable by simple and inexpensive reciprocating drive means. Moreover, this reciprocating movement only requires two positions and this simplifies operation over a limited and easily controllable displacement path.

The magnetic elements 103 fit over part of the thermal bodies 11 so that the latter is straddled and surrounded on each side by the arms of the magnetic elements 103. Since there are twice as many thermal bodies 11 as magnetic elements 103, as the magnetic elements 103 pivot in reciprocation relative to the thermal bodies 11 the latter are, in succession, face to a magnetic element 103 or may not so.

In this example the thermal bodies 11 are orientated essentially parallel to the pivoting axis of the ring 104 and the magnetic elements 103 are orientated with their gap essentially parallel to the pivoting axis.

In a modified example, the device 1 comprises commutation and synchronization means. Thus, in a first stage, the heat transfer fluid heated by a thermal body 11 subjected to a magnetic field circulates in a "hot circuit" towards a calorie exchanger. In a second stage, the heat transfer fluid cooled by the thermal body 11 in the absence of a magnetic field or subjected to a different magnetic field, circulates in a "cold circuit" towards a frigorie exchanger.

This thermal flux generation unit 10 can be coupled with other units, whether similar or not, with which it can be connected in series and/or in parallel and/or in a series/parallel combination.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A heat exchanging system for conditioning indoor temperature of a building, comprising:
   a magnetic refrigerator;
   an indoor heat exchanger, thermally connected to the magnetic refrigerator; and
   an outdoor heat exchanger, thermally connected to the magnetic refrigerator, comprising a geothermal heat exchanging unit, wherein the geothermal heat exchanging unit is embedded under the ground of a building.

2. The heat exchanging system as claimed in claim 1, wherein in a cooling state, heat inside of the building is moved by the magnetic refrigerator from the indoor heat exchanger to the outdoor heat exchanger to be dissipated to the ground, and in a heating state, heat from the ground is moved by the magnetic refrigerator from the outdoor heat exchanger to the indoor heat exchanger to heat the building.

3. The heat exchanging system as claimed in claim 1, wherein the outdoor heat exchanger further comprises an air heat exchanging unit, wherein the air heat exchanging unit and the geothermal heat exchanging unit are thermally connected to the magnetic refrigerator.

4. The heat exchanging system as claimed in claim 3, wherein an outdoor heat exchanging fluid is filled in the outdoor heat exchanger, and the outdoor heat exchanging fluid travels from the magnetic refrigerator, to pass through the air heat exchanging unit and the geothermal heat exchanging unit, before traveling back to the magnetic refrigerator.

5. The heat exchanging system as claimed in claim 1, wherein an outdoor heat exchanging fluid is filled in the outdoor heat exchanger, and the outdoor heat exchanging fluid travels from the magnetic refrigerator, to pass through the geothermal heat exchanging unit, before traveling back to the magnetic refrigerator.

6. The heat exchanging system as claimed in claim 5, wherein the geothermal heat exchanging unit comprises a tortuous portion.

7. The heat exchanging system as claimed in claim 5, wherein the geothermal heat exchanging unit comprises an outer path, an inner path and an insulation layer, wherein the insulation layer separates the outer path from the inner path, and the outdoor heat exchanging fluid travels from the magnetic refrigerator, along the inner path, and then back to the magnetic refrigerator via the outer path to exchange heat with the ground.

8. A building, disposed on a ground, comprising:
   a building body;
   a heat exchanging system comprising:
      a magnetic refrigerator;
      an indoor heat exchanger, disposed inside of the building body and thermally connected to the magnetic refrigerator; and
      an outdoor heat exchanger, disposed outside of the building body and thermally connected to the magnetic refrigerator, comprising a geothermal heat exchanging unit, wherein the geothermal heat exchanging unit is embedded under the ground.

9. The building as claimed in claim 8, wherein in a cooling state, heat inside of the building is moved by the magnetic refrigerator from the indoor heat exchanger to the outdoor heat exchanger to be dissipated to the ground, and in a heating state, heat from the ground is moved by the magnetic refrigerator from the outdoor heat exchanger to the indoor heat exchanger to heat the building.

10. The building as claimed in claim 8, wherein the outdoor heat exchanger further comprises an air heat exchanging unit, and the air heat exchanging unit and the geothermal heat exchanging unit are thermally connected to the magnetic refrigerator.

11. The building as claimed in claim 10, wherein an outdoor heat exchanging fluid is filled in the outdoor heat exchanger, and the outdoor heat exchanging fluid travels from the magnetic refrigerator, to pass through the air heat exchanging unit and the geothermal heat exchanging unit, before traveling back to the magnetic refrigerator.

12. The building as claimed in claim 8, wherein an outdoor heat exchanging fluid is filled in the outdoor heat exchanger, the outdoor heat exchanging fluid travels from the magnetic refrigerator, passing through the geothermal heat exchanging unit, and then back to the magnetic refrigerator.

13. The building as claimed in claim 12, wherein the geothermal heat exchanging unit comprises a tortuous portion.

14. The building as claimed in claim 12, wherein the geothermal heat exchanging unit comprises an outer path, an inner path and an insulation layer, wherein the insulation layer separates the outer path from the inner path, and the outdoor heat exchanging fluid travels from the magnetic refrigerator, along the inner path, and then back to the magnetic refrigerator via the outer path to exchange heat with the ground.

* * * * *